(12) United States Patent
Rodriguez et al.

(10) Patent No.: US 7,401,222 B2
(45) Date of Patent: Jul. 15, 2008

(54) METHOD OF AUTHENTICATION OF MEMORY DEVICE AND DEVICE THEREFOR

(75) Inventors: Alberto Rodriguez, Webster, NY (US); Scott Jonathan Bell, Rochester, NY (US); Heiko Rommelmann, Penfield, NY (US); Edwin Kuyt, Marion, NY (US)

(73) Assignee: Xerox Corporation, Norwalk, CT (US)

( * ) Notice: Subject to any disclaimer, the term of this patent is extended or adjusted under 35 U.S.C. 154(b) by 736 days.

(21) Appl. No.: 11/012,479

(22) Filed: Dec. 16, 2004

(65) Prior Publication Data

US 2006/0136989 A1 Jun. 22, 2006

(51) Int. Cl.
*H04L 9/00* (2006.01)
*H04L 9/32* (2006.01)

(52) U.S. Cl. .................. 713/168; 713/170; 713/189; 713/193

(58) Field of Classification Search ......... 713/168–170, 713/189, 192–194; 726/26–27
See application file for complete search history.

(56) References Cited

U.S. PATENT DOCUMENTS 4,888,802 A * 12/1989 Cooney .................. 380/277
5,150,407 A * 9/1992 Chan ..................... 713/178
5,237,609 A * 8/1993 Kimura .................. 713/193
6,757,832 B1 6/2004 Silverbrook et al.

FOREIGN PATENT DOCUMENTS

EP 0 427 465 A2 5/1991
WO WO 01/43338 A1 6/2001

* cited by examiner

*Primary Examiner*—Hosuk Song
(74) *Attorney, Agent, or Firm*—Oliff & Berridge, PLC

(57) ABSTRACT

A memory device authentication method that includes providing a memory device in a host device, and providing both an encryption algorithm, triggering the encryption algorithm during writing of data in the memory device, wherein the encryption algorithm allters the written data and generates a device altered data, then storing the written data in the memory device, running the encryption algorithm in the host device on the data written in the memory device and generating a host altered data, the verifying authenticity of the memory device by comparing the device altered data and the host alerted data. An authentication device and associated system that includes a host device that comprises a unit, a first encryption algorithm that is stored in the host device, and a second encryption algorithm, identical to the first encryption algorithm, that is permanently stored in a memory of the unit.

16 Claims, 4 Drawing Sheets

METHOD OF AUTHENTICATION OF MEMORY DEVICE AND DEVICE THEREFOR

Co-pending application Ser. Nos. 11/012,478, 11/034,249, 11/034,248, 11/013,798, 11/012,480, 10/978,423, 11/034,058, 11/013,703 are incorporated herein in their entirety by reference.

BACKGROUND

1. Field

The present invention relates generally to the utilization of commonly replaced system parts. The invention relates in particular to preventing unauthorized reproduction of memory devices, such as Customer Replaceable Unit Monitors (CRUM).

2. Description of Related Art

Program execution control technologies are known in the field to which the present invention belongs. The program execution control technologies are technologies to embed a routine for user authentication during the use of an application program, have the routine examine whether the user attempting execution of the application possesses a key for proper authentication, and continue the program only when the existence of the key for authentication is verified, otherwise to halt execution.

By using these technologies, execution of the application program is enabled only for proper users having the authentication key. The technologies are generally commercialized in the software marketing field, two examples being Sentine/SuparPro (trade mark) from Rainbow Technologies, Inc. and HASP (trade mark) from Aladdin Knowledge Systems, Ltd.

In the use of program execution control technologies, a user who executes software possesses an authentication key as user identification information. The authentication key is a key for encryption and is distributed to the user by a party who allows use of software, a software vender, for example. The authentication key is securely sealed in a memory, or the like, of hardware to prevent duplication, and is delivered to the user using physical means such as the postal service. The user mounts personal computer/workstation using a designated method. When the user starts up the application program and when the execution of the program reaches the user authentication routine, the program communicates with the hardware in which the authentication key of the user is embedded. Based on the results of the communication, the program identifies the authentication key, and moves the execution to the following step upon confirmation of existence of the correct authentication key. If the communication fails and the verification of the existence of the authentication key is not established, the program stops automatically, discontinuing the execution of subsequent steps.

Identification of the authentication key by the user authentication routine is executed according to the following protocol, for example the user authentication routine generates and transmits an appropriate number to the hardware in which the key is embedded, the hardware in which the key is embedded encrypts the number using the embedded authentication key and transmits it back to the authentication routine, the authentication routine determines whether or not the number transmitted back is the number expected beforehand, or, in other words, the number obtained by encrypting the number with a correct authentication key. If the number transmitted back coincides with the expected number, the execution of the program continues, otherwise the execution is halted. In this case, communication between the application program and the hardware in which the authentication key is embedded must be different for each execution even if it is between the same location in the same application with the same hardware.

Otherwise, a user who does not possess the correct authentication key may be able to execute the program by recording once the content of communication during the normal execution process, and by responding to the application program according to the recording each time the subsequent program is executed. Such improper execution of the application program by replaying the communication content is called a replay attack.

In order to prevent a replay attack, in general, a random number is generated and used for each communication as the number to be transmitted to the hardware in which the key is embedded.

Many machines have replaceable sub-assemblies. Printing machines, for example, may have a number of replaceable sub-assemblies, such as a fuser print cartridge, a toner cartridge, or an automatic document handler. These subassemblies may be arranged as a unit called a cartridge, and if intended for replacement by the customer or machine owner, may be referred to as a Customer Replaceable Unit or CRU. Examples of CRUs may include a printer cartridge, a toner cartridge, or a transfer assembly unit. It may be desirable for a CRU design to vary over the course of time due to manufacturing changes or to solve post-launch problems with either the machine, the CRU, or an interaction between the CRU and the machine. Further, design optimizations may be recognized subsequent to design launch and machine sale, for example, that a relatively simple code update might realize. However, solving these problems, or providing optimization updates, generally requires a service call.

U.S. Pat. No. 4,961,088 to Gilliland et al. discloses a monitor/warranty system for electrostatographic reproducing machines in which replaceable cartridges providing a predetermined number of images are used. Each cartridge has an EEPROM programmed with a cartridge identification number that, when matched with a cartridge identification number in the machine, enables machine operation, a cartridge replacement warning count, and a termination count at which the cartridge is disabled from further use. The EEPROM stores updated counts of the remaining number of images left on the cartridge after each print run.

U.S. Pat. No. 6,016,409 to Beard et al. discloses a fuser module comprising a fuser subsystem installable in a xerographic printing apparatus, which includes an electronically-readable memory permanently associated therewith. The control system of the printing apparatus reads out codes from the electronically-readable memory when installed to obtain parameters for operating the module, such as maximum web use, voltage and temperature requirements, and thermistor calibration parameters.

U.S. Pat. No. 5,987,134 to Shin et al. provides a device for authenticating user's access rights to resources, which comprises first memory means for storing challenging data, second memory means for storing unique identifying information of the user, third memory means for storing proof support information which is a result of executing predetermined computations to the unique identifying information of the user and unique security characteristic information of the device, response generation means for generating a response from the challenging data stored in the first memory means, the unique identifying information stored in the second memory means and the proof support information stored in the third memory means, and verification means for verifying, the legitimacy of the response by verifying that the response, the challenging data and the unique security characteristic information of the device satisfy a specific predefined relation.

U.S. Patent Publication 2003/0005246 to Peinado et al. describes a device for securely recording projected content to a portable memory and for reading the projected content therefrom. The device is adapted to read or write specially-configured portable memories that are incompatible with standard read and write devices. For example, the device may be designed to work with memories having an unusual type or size, or may manipulate the data in a nonstandard way before storing the data in the memory.

U.S. Pat. No. 6,035,368 to Habib et al. describes a method for protecting against EEPROM directed intrusion into a mobile communication device by an external interfacing master in which an incipient powering operation of the device is detected. The mobile communication device carries an EEPROM and a microprocessor that are interconnected via an electrical interface. The microprocessor detects whether the external interfacing master tries to fraudulently access the EEPROM through the electrical interface. Upon such detection, the microprocessor undertakes a protecting measure for blocking subsequent reading of the EEPROM by the external interfacing master.

All of the references indicated above are herein incorporated by reference in their entirety for their teachings.

SUMMARY

Potential counterfeiters may determine the behavior of legacy devices such as, for example, customer replaceable units, simply by experimentation. Potential counterfeiters may thus successfully manufacture devices that emulate the behavior of the legacy devices enough to satisfy the host machines that typically host the legacy devices. Accordingly, with a sufficient number of samples of a given legacy device, potential counterfeiters may reverse engineer legacy devices and reproduce them.

In light of the above-described problems and shortcomings, a memory device authentication method may include providing a memory device in a host device, providing the memory device and the host device with an encryption algorithm, triggering the encryption algorithm during writing of data in a temporary register of the memory device, wherein the encryption algorithm alters the written data and generates a device altered data. The method may further include storing the written data in the memory device, running the encryption algorithm in the host device on the data written in the temporary register of the memory device and generating a host altered data, and verifying authenticity of the memory device by comparing the device altered data and the host altered data.

An authentication device may include a host device that comprises a unit, a first encryption algorithm that is stored in the host device, and a second encryption algorithm, identical to the first encryption algorithm, that is permanently stored in a memory of the unit.

A machine-readable medium may include instructions for memory device authentication, the instructions, when executed by a processor, causing the processor to provide a memory device in a host device, to provide the memory device and the host device with an encryption algorithm, to trigger the encryption algorithm during writing of data in a temporary register of the memory device, wherein the encryption algorithm alters the written data and generates a device altered data. The instructions may further cause the processor to store the written data in the memory device, to run the encryption algorithm in the host device on the data written in the temporary register of the memory device and generate a host altered data, and to verify authenticity of the memory device by comparing the device altered data and the host altered data.

DETAILED DESCRIPTION

Figure 1:
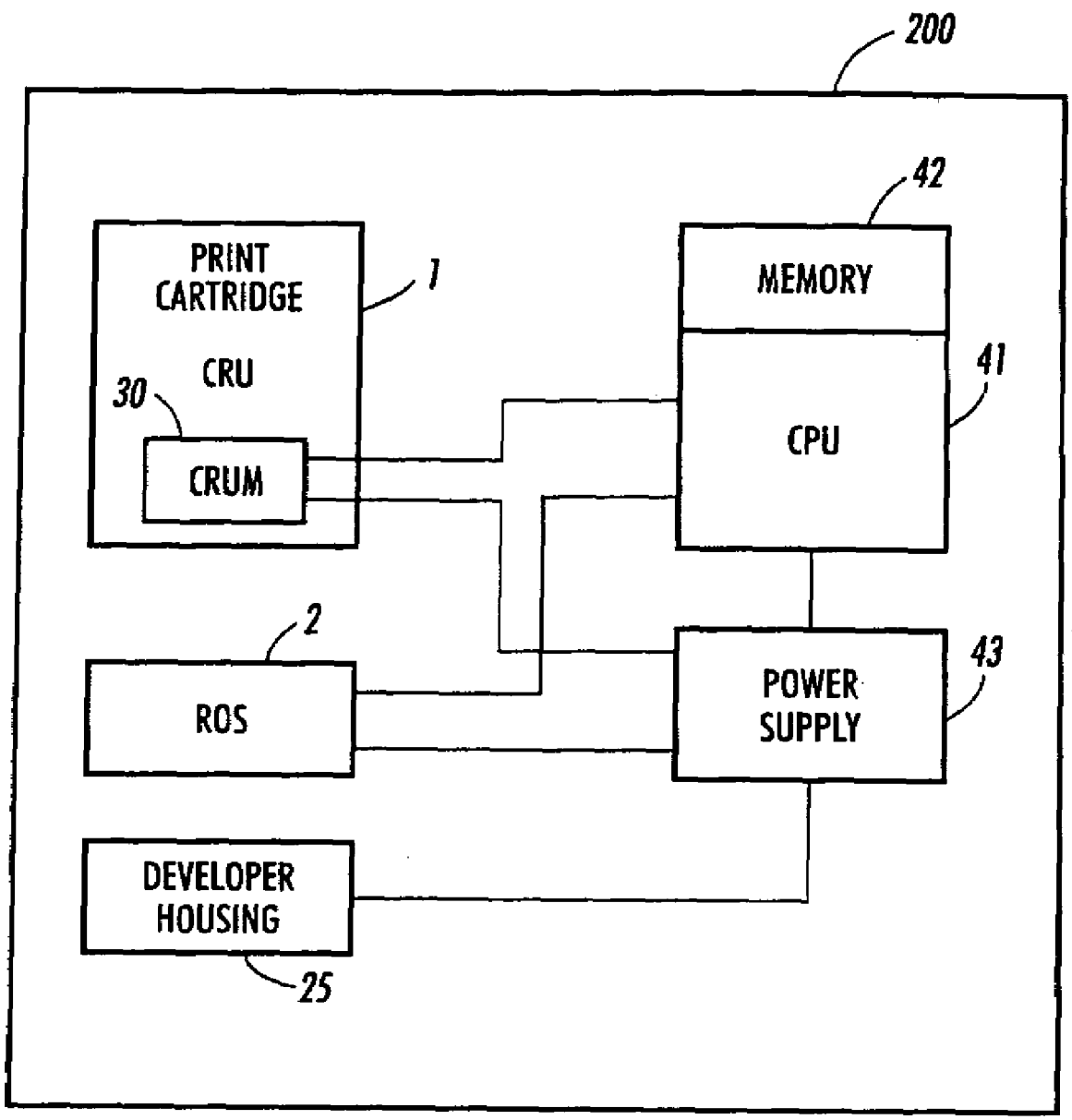
FIG. 1 is a block diagram of various elements in an exemplary machine and their interoperable relationships.

FIG. 1 is a block diagram of various elements in an exemplary machine 200 and their interoperable relationships. The machine 200, while shown as a laser printer in FIG. 1, may also be a printer/copier, a fax/scanner/printer or any other machine in which a CRU may be useful. Within the machine 200 is a CPU 41, which comprises its own memory 42, either on the same chip-die or locally off-chip. The memory 42 may include bit maps and other stored parameters for use in setpoints utilized within the machine 200. When a power supply 43 of the machine 200 is switched on, the boot sequence in the memory 42, which CPU 41 invokes, may include instructions to poll any CRUs present in the machine 200. The exemplary CRU may be the print cartridge CRU 1 described above. As CPU 41 polls CRUs, the CPU 41 checks for indications of software updates or tags to invoke. There may be lines of software code or other executable instruction to be read in and substituted.

The CPU 41 may also be provided with code which continually polls for the replacement of a CRU. Alternatively, the CPU 41 may respond to an interrupt from the replacement of a CRU. In either case, upon determination of a replaced or new CRU 1, the CPU 41 polls the CRU 1 and its memory chip 30, which may be a customer replaceable unit monitor (CRUM), for an indication that there are software updates of executable instructions or new setpoints to invoke.

Figure 2:
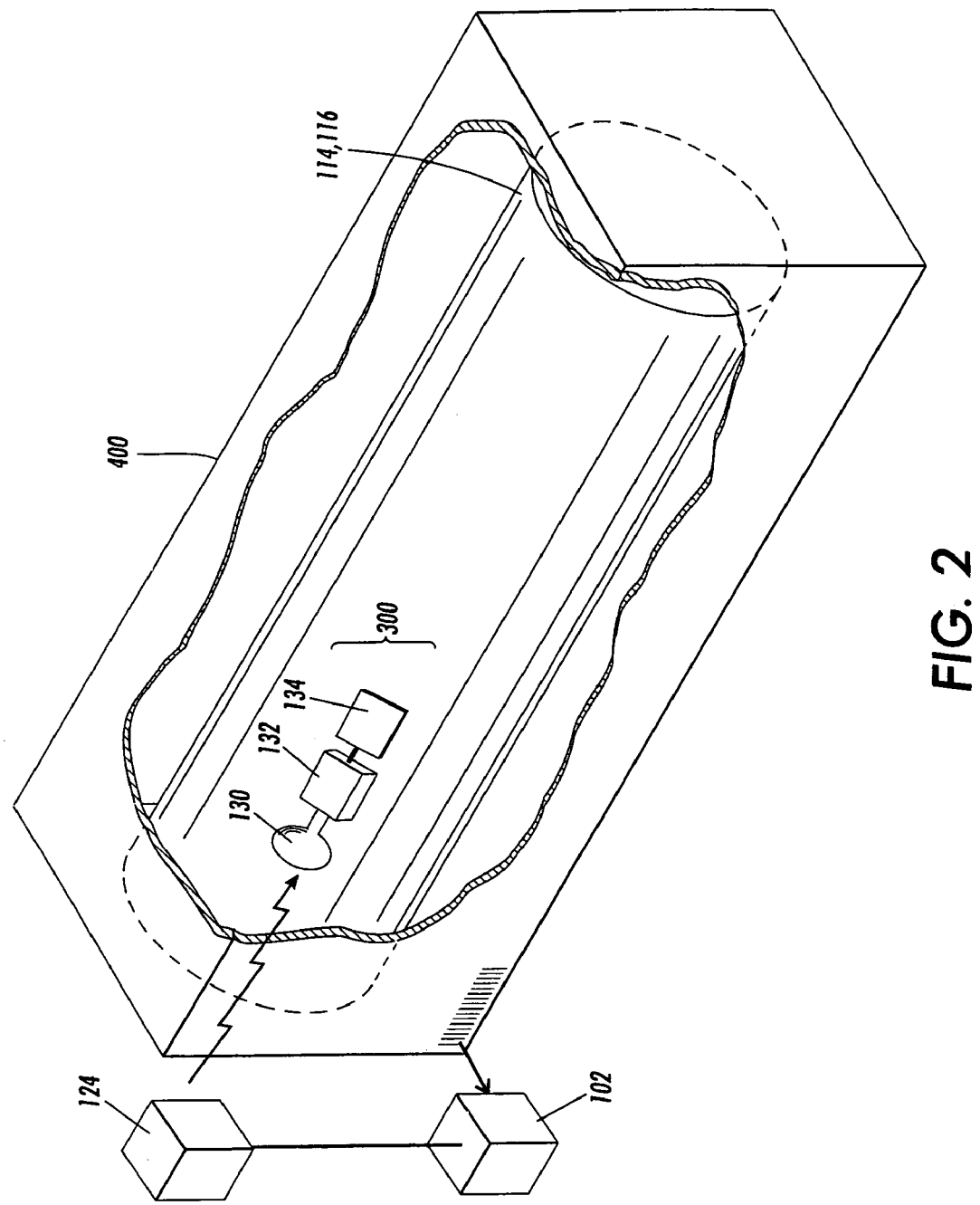
FIG. 2 is a simplified view showing how a module disposed within a signal-transmissive package may be accessed and operated by wireless means.

FIG. 2 is a simplified view showing how a module disposed within a signal-transmissive package 400 may be accessed and operated by wireless means. A device 124, which emits suitable RF or infrared radiation, may be used to write relevant data into the memory 134 of the CRUM 300. Such data may be of a time sensitive variety, such as the date a particular package module is sent to an end user. In such a case, it may be desirable to have the module itself prepackaged and write the date of mailing to the memory 134, just as the package 400 is sent out of the door. Similarly, special codes may be read from the memory 134 representing, for example, the identity of the end user intended to receive the module, or a particular service contract number under which the packaged module is sent. Because of the wireless nature of writing to the memory 134, a supply of modules, already in packages 400, may be retained in a warehouse and provided with relevant information only as they are sent to end users.

Another possibility is to package different modules 114, 116, and have a bar code reader 102, or an equivalent device, read markings on the package 400, and then cause the device 124 to write data relating to the bar code data into the memory 134 by wireless means. For example, the bar code reader 102 may read a bar code on the outer surface of the package 400 representative of the addressee of the package, and cause the device 124 to write a code identifying the address into the memory 134.

Alternatively or additionally, when the CRUM 300 is capable of broadcasting back information to the memory 134 by wireless means as well, the particular CRUM 300 within package 400 may be queried by wireless means just as it is being sent to a user, and the information recorded, so that a vendor may know exactly which CRUMs, identified by serial number, were sent to what addressee at any particular time. Another possibility is to determine the serial number of a module within a package 400 by wireless means, and then have a bar code writer print a bar code relating to the serial number on a label to be attached to the package 400.

Another feature enabled by the use of wireless communication may be the use of one transmitter/receiver within the machine being able to communicate with multiple modules used within the machine. This would provide a cost saving, as multiple harnesses for each device would not be needed.

Figure 3:
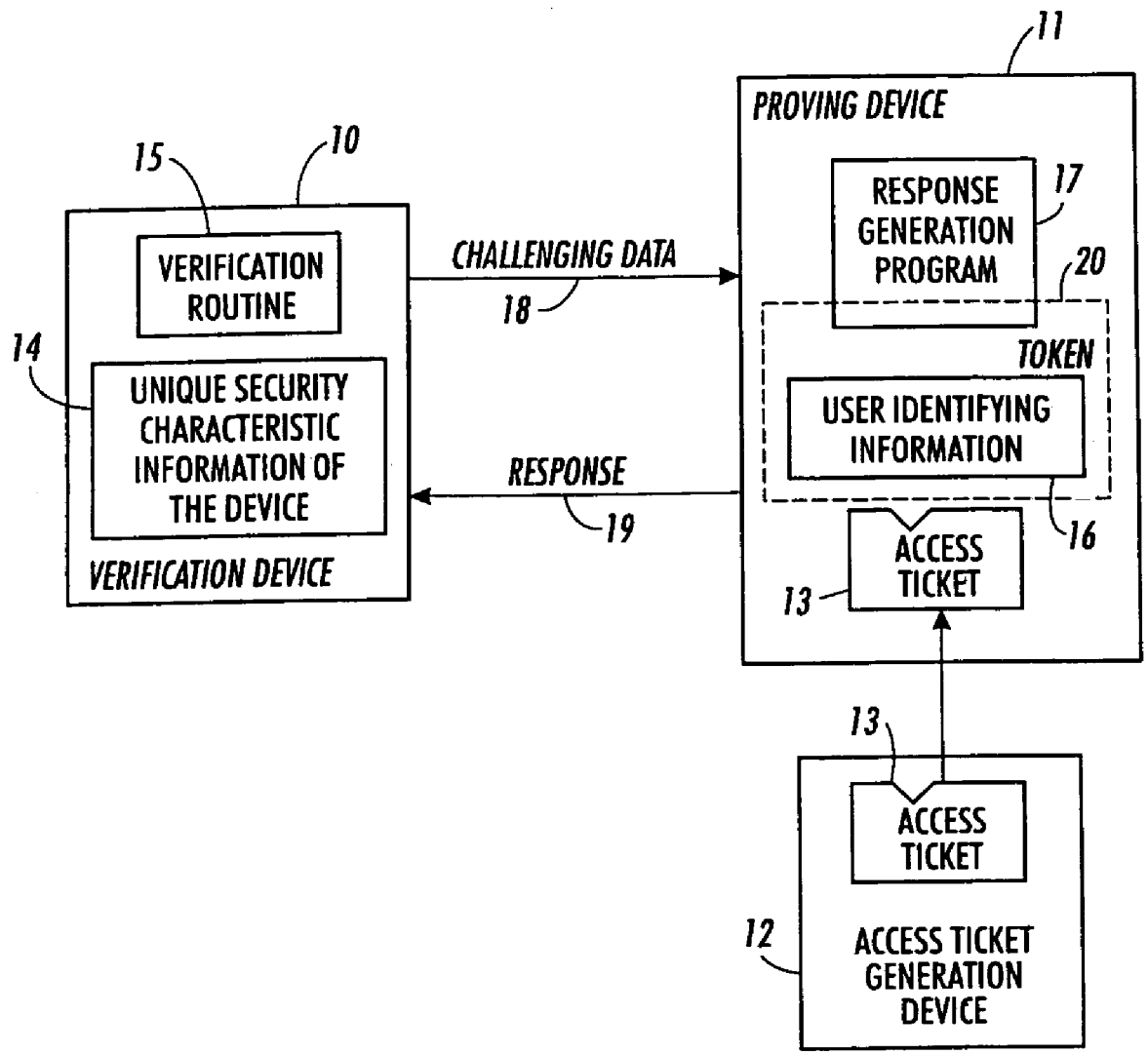
FIG. 3 is a block diagram showing an example of the fundamental constitution of an authorization system.

FIG. 3 describes a user authentication system that is known in the art and that comprises a verification device 10 and a proving device 11, the proving device 11 receives an access ticket (proof support data) from an access ticket generation device 12; the verification device 10 executes a verification routine 15; the proving device 11 retains user identifying information 16 and the access ticket 13 and executes a response generation program 17.

The access ticket generation device 12 is installed in the protector side, such as an application provider. The access ticket generation device 12 generates the access ticket 13 based on unique security characteristic information of the device 14 and the user identifying information 16 and the access ticket 13 is forwarded to the user through communication or sending of a floppy-diskette or the like to be retained by the proving device 11 of the user. Then the verification devices 10 sends challenging data 18 to the proving device 11. The proving deice 181 generates a response 19 by utilizing the access ticket 13 and the user identifying information 16, and returns it to the verification device 10. The verification device 10 verifies the legitimacy of the response based on the challenging data, that is, the verification device 10 verifies that the response has been generated based on the challenging data and the unique security characteristic information of the device.

If the legitimacy of the response is verified, the access rights of the user is authenticated; accordingly, continuation of execution of a program, access to files, and so forth, are permitted.

In the constitution, a user of an application program retains only one piece of user identifying information 16. The user identifying information is equivalent to a password in the password authentication and is unique, significant information which identifies the user. If it is possible for the user to copy and distribute the user identifying information 16, it will lead to the use of the application program by the user without legitimate access rights; therefore, the user identifying information 16 is protected by protection means so that even the user who is a legitimate owner of the user identifying information 16 cannot steal it. The protection means may be hardware with a protecting effect (hereinafter referred to as tamper-resistant hardware) against theft of the inside conditions by external probes. A method of implementation of the tamper-resistant hardware will be described later.

In addition to the user identifying information 16, the response generation program 17 which executes predetermined computations is provided to the user. The program 17 performs communication with a user authentication routine (verification routine 15): on receiving two parameters, namely, the user identifying information 16 and the access ticket 13, the program 17 executes computations to arbitrary inputted values to generate the response 19 for identifying the user. The user identifying information 16 is used in the course of the computation, and it is required to protect at least a part of the program 17 by the protection means since leakage of the user identifying information 16 to the outside will cause a problem by the above-described reason.

Hereinafter, memory means for storing the user identifying information and a part of the program which are protected by the protection means, device for executing the part of the program (for example, consisting of a memory and a MPU) and the protection means are integrally referred to as a token (shown by the reference numeral). The token may have portability, like a smart card.

Similar to the conventional execution control technologies, the verification routine 15 is set to the application program. The verification routine 15 is the same as that of the conventional technologies in that it communicates with the response generation program 17 retained by the user, and continues execution of the program if and only if a returned result (response 19) is correct. Therefore, it is necessary that the program creator knows the method of computing the combination of transferred data (challenging data 18) and correct returned data corresponding thereto (response 19).

Figure 4:
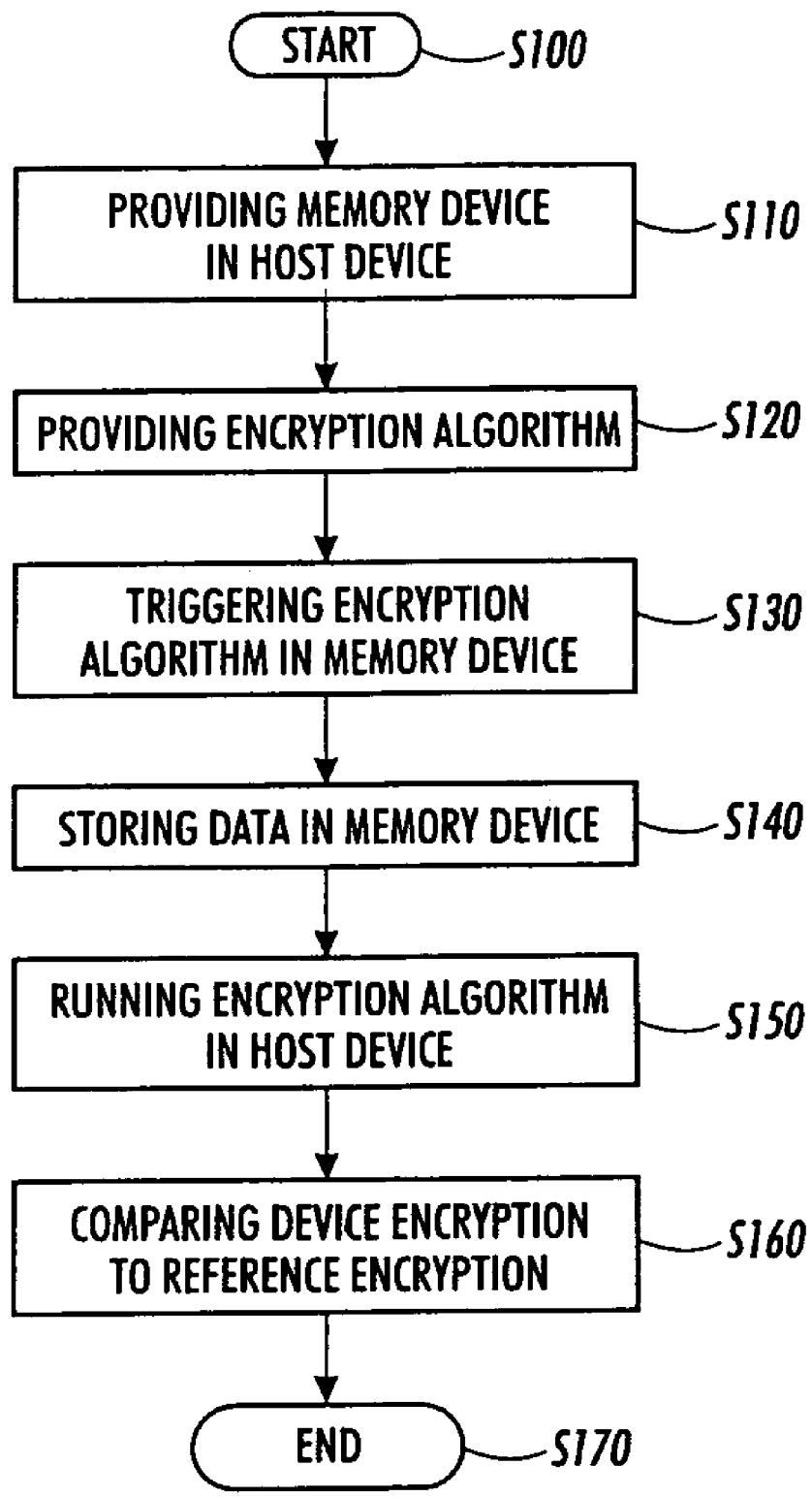
FIG. 4 is a flowchart illustrating an exemplary memory device authentication method according to various implementations.

FIG. 4 is a flowchart illustrating an exemplary memory device authentication method. In FIG. 4, the method starts in step S100 and continues to step S110. During step S110, a memory device such as, for example, a customer replaceable unit monitor (CRUM), is provided in a customer replaceable unit (CRU) that is hosted in a host device. According to various implementations, the CRUM such as, for example, an electrically erasable read-only memory (EEPROM), records information related to the use of the CRU. According to various implementations, the information related to the use of the CRU is later read by the producer of the CRU once the CRU is discarded from the host device, and the recorded information allows the producer to determine parameters such as, for example, usage and behavior data of the CRU. Accordingly, once the EEPROM that is coupled to the CRU is inserted into a host devices a write cycle communication sequence may begin that allows the EEPROM to store usage information. According to various implementations, the write cycle communication sequence may be, for example, a serial write cycle communication device. According to various implementations, the data written to the EEPROM is actually stored in a temporary register until after the serial communication is complete. Next, control continues to step S120.

During step S120, an encryption algorithm is provided to the memory device such as, for example, the EEPROM, and an identical encryption algorithm is also provided to the host device such as, for example, a printer. According to various exemplary implementations, more than one algorithm can be used in order to generate encrypted data. According to various implementations, the selection of a specific data can be performed, for example, from a time sequence, wherein different algorithms are triggered at different times, in order to prevent decryption of the algorithms by, for example, "brute force attack" decryption tools. Next, control continues to step S130. During step S130, and during the writing of the usage data to the EEPROM, the encryption algorithm in the EEPROM is triggered and alters the data that is stored in the temporary register of the EEPROM to generate encrypted data. Next, control continues to step S140. During step S140, the encrypted data is then stored in a memory cell of the EEPROM. Next, control continues to step S150.

During step S150, the host device applies the same encryption algorithm to the encrypted data stored in the memory cell of the EEPROM. Accordingly, during step S150, the host device runs the encryption algorithm in reverse. In other words, the encryption algorithm of the host device runs the encrypted data that is generated by the memory device, or EEPROM, and generates data resulting from the deencryption of the encrypted memory device data. Next, control continues to step S160, during which the data that is generated in the host device is compared to a reference encryption such as, for example, the data that was encrypted in the memory device. According to various exemplary implementations, the memory device encryption may also be compared to an encryption located in a secret zone of the CRUM. According to various implementations, such a comparison determines whether the memory device is genuine, i.e., has been produced by the legitimate producer of the memory device, or whether it is a reverse engineered copy, because a reverse engineered copy would not contain the same encryption algorithm as the host device. Next, control continues to step S170, where the method ends.

While various details are described above in connection with exemplary implementations, it is understood that the details and exemplary implementations are not intended to be limiting. On the contrary, various alternatives, modifications and equivalents may be apparent based on the foregoing description.

What is claimed is:

1. A memory device authentication method, comprising:
   providing a memory device in a host device;
   providing the memory device and the host device with an encryption algorithm;
   triggering the encryption algorithm during writing of usage data in a temporary register of the memory device, wherein the encryption algorithm alters the written data and generates a device altered data;
   storing the written data in the memory device;
   running the encryption algorithm in the host device on the usage data written in the temporary register of the memory device and generating a host altered data; and
   verifying authenticity of the memory device by comparing the device altered data and the host altered data.

2. The method of claim 1, further comprising providing the memory device with the encryption algorithm in a secret area of the memory device.

3. The method of claim 1, wherein the encryption algorithm is sufficiently complex to substantially prevent reconstruction of the altered data.

4. The method of claim 1, wherein
   the encryption algorithm comprises an aggregate algorithm;
   the aggregate algorithm comprises more than one possible permutation; and
   the permutations are triggered by a number stored in the memory device.

5. The method of claim 4, wherein the number and encryption algorithm are stored in a secret area.

6. The method of claim 4, wherein the number is stored in a different area than the encryption algorithm.

7. An authentication device, comprising
   a host device;
   a unit having a memory;
   a first encryption algorithm that is stored in the host device and generates a host altered data from usage data written in the memory; and
   a second encryption algorithm, identical to the first encryption algorithm, that is permanently stored in the memory of the unit and generates a device altered data from the usage data written in the memory,
   wherein the host altered data and the device altered data are compared to verify authenticity of the unit.

8. The device of claim 7, wherein the memory of the unit comprises an EEPROM.

9. The device of claim 7, further comprising providing the second encryption algorithm in a secret area of the memory of the unit.

10. An authentication system, comprising:
    a controller;
    a host device;
    a unit having a memory device, the memory device being controlled by the controller;
    a first encryption algorithm provided to the memory device; and
    a second encryption algorithm, identical to the first encryption algorithm, provided to the host device; wherein
    usage data written in the memory device is encrypted using the first encryption algorithm and stored in the memory device under control of the controller,
    the usage data written in the memory device is encrypted using the second encryption algorithm and stored in the host device under control of the controller; and
    the authenticity of the memory device is verified by the controller by comparing the encrypted data stored in the memory device and the encrypted data stored in the host device.

11. The system of claim 10, wherein the memory device comprises an EEPROM.

12. The system of claim 10, wherein the first encryption algorithm is provided in a secret area of the memory device.

13. The system of claim 10, wherein
    at least one of the first and the second encryption algorithm comprises an aggregate algorithm;
    the aggregate algorithm comprises more than one possible permutation; and
    the one or more permutation is triggered by a number stored in the memory device.

14. The method of claim 13, wherein the number and the first encryption algorithm are stored in a secret area.

15. The method of claim 13, wherein the number is stored in a different area than the first encryption algorithm.

16. A machine-readable medium that provides instructions for memory device authentication, the instructions, when executed by a processor, causing the processor to perform the operations of claim 1.

* * * * *